United States Patent
Lim et al.

(10) Patent No.: US 9,977,994 B2
(45) Date of Patent: May 22, 2018

(54) CONFIGURABLE HISTOGRAM-OF-ORIENTED GRADIENTS (HOG) PROCESSOR

(71) Applicant: Apple Inc., Cupertino, CA (US)

(72) Inventors: Suk Hwan Lim, Mountain View, CA (US); Jaewon Shin, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 14 days.

(21) Appl. No.: 15/198,360

(22) Filed: Jun. 30, 2016

(65) Prior Publication Data

US 2018/0005078 A1    Jan. 4, 2018

(51) Int. Cl.
G06K 9/00 (2006.01)
G06K 9/62 (2006.01)
G06K 9/46 (2006.01)

(52) U.S. Cl.
CPC ......... G06K 9/6212 (2013.01); G06K 9/4604 (2013.01)

(58) Field of Classification Search
CPC ..................... G06K 9/6212; G06K 9/4604
USPC ................. 382/168, 170, 246; 1/1; 348/143; 710/68; 712/300
See application file for complete search history.

(56) References Cited

U.S. PATENT DOCUMENTS

| | | | |
|---|---|---|---|
| 6,330,666 B1 * | 12/2001 | Wise | G06F 9/3867 382/246 |
| 7,046,842 B2 | 5/2006 | Lin et al. | |
| 8,171,030 B2 | 5/2012 | Pereira et al. | |
| 8,582,889 B2 | 11/2013 | Vaddadi et al. | |
| 8,737,737 B1 | 5/2014 | Feldman et al. | |
| 9,547,881 B2 * | 1/2017 | Xu | G06T 1/20 |
| 9,554,100 B2 * | 1/2017 | Gousev | G06K 9/00362 |
| 2003/0185420 A1 * | 10/2003 | Sefcik | G06K 9/3241 382/103 |
| 2016/0014421 A1 | 1/2016 | Cote et al. | |
| 2018/0005344 A1 * | 1/2018 | Lim | G06T 1/20 |
| 2018/0007333 A1 * | 1/2018 | Lim | H04N 9/646 |
| 2018/0007334 A1 * | 1/2018 | Lim | H04N 9/646 |

* cited by examiner

*Primary Examiner* — Aaron W Carter
(74) *Attorney, Agent, or Firm* — Fenwick & West LLP

(57) ABSTRACT

Embodiments relate to a histogram-of-oriented gradients (HOG) module. The HOG module is implemented in hardware rather than software. The HOG module applies an algorithm to an image to identify gradient orientation in localized portions of the image. The HOG module creates a histogram-of orientation gradients based on the identified gradient orientations.

18 Claims, 10 Drawing Sheets

CONFIGURABLE HISTOGRAM-OF-ORIENTED GRADIENTS (HOG) PROCESSOR

BACKGROUND

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way. For example, the image processing pipeline may employ an image processing algorithm used to calculate histograms-of-oriented gradients (HOG) of image data. The image processing algorithm is typically performed by executing software programs on a central processing unit (CPU). However, execution of such programs on the CPU consumes significant bandwidth of the CPU and other peripheral resources as well as increase power consumption.

SUMMARY

The embodiments herein describe a histogram-of-oriented gradients (HOG) module that is implemented in hardware rather than software. The HOG module includes configuration registers that store configuration values that set operation parameters of the HOG module. The HOG module generates histograms of different types of HOG features of image data based on configuration values stored in the configuration registers.

The embodiments herein also describe a patch mode of the HOG module. During the patch mode, the HOG module processes image data that includes multiple image patches. The image patches may be extracted from different source images or from a single source image. The HOG module processes the image data to generate a histogram of gradient features for each image patch included in the image.

Figure 1:
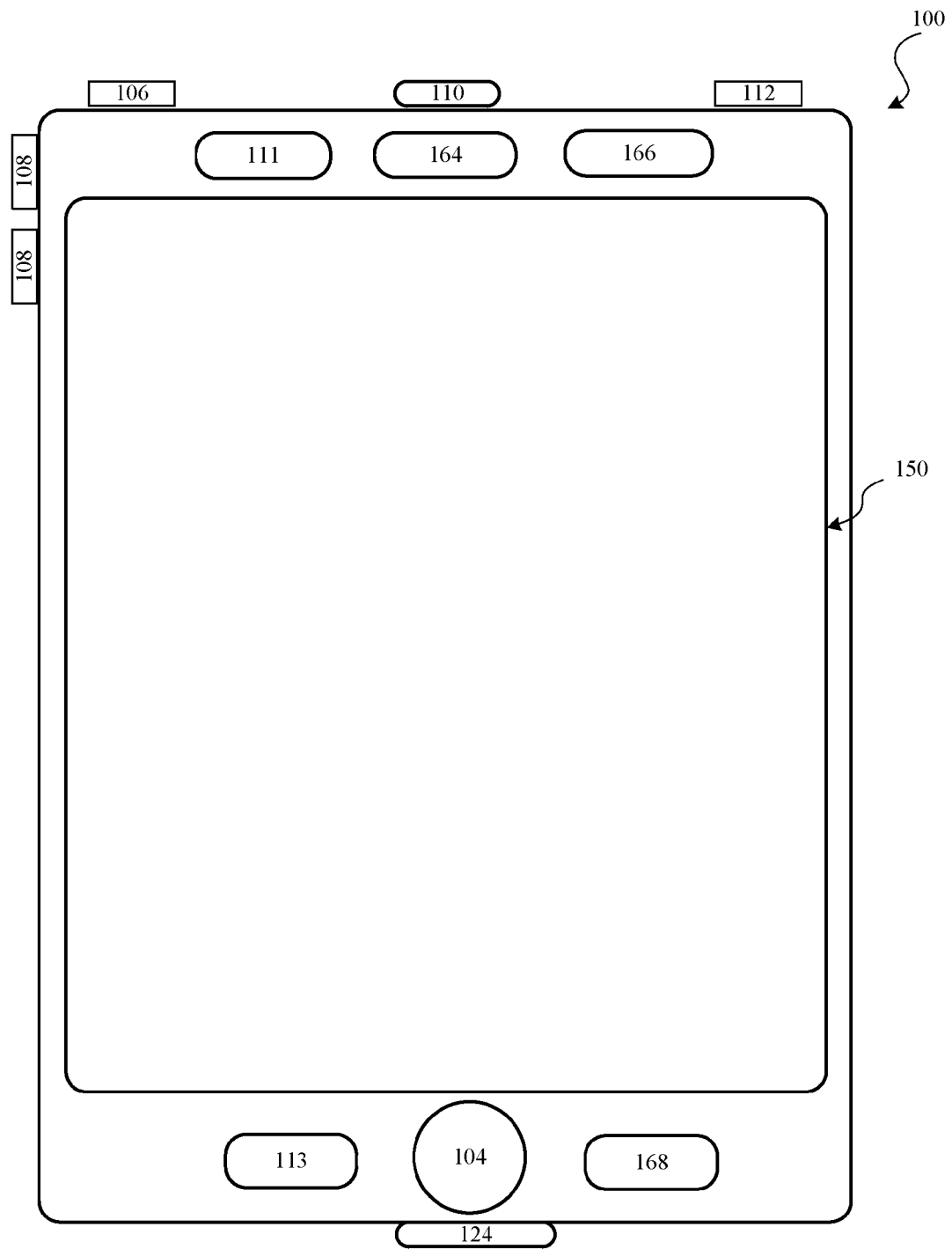
FIG. 1 is a high-level diagram of an electronic device, according to one embodiment

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to a histogram-of-oriented gradients (HOG) module that is implemented in hardware rather than software. The HOG module applies an algorithm to an image to identify gradient orientation in localized portions of the image. The HOG module generates gradient features of the image such as a histogram-of-oriented gradients based on the identified gradient orientations. By implementing the HOG module in hardware rather than software, the HOG module reduces bandwidth and power consumption of the CPU that is typically responsible for creating gradient features of images.

Furthermore, the HOG module can operate in a patch mode. During the patch mode, the HOG module processes an image composed of multiple image patches. The image patches may be extracted from different source images or from a single source image. The HOG module can identify gradient features for each of the image patches included in the image. By operating in the patch mode, the HOG module can efficiently process the different image patches in a single image rather than process the different images from which the different image patches were extracted or process the entire source image from which the image patches were extracted.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which may be combined into a components or have a different configuration or arrangement. The various components of device 100 listed above are embodied in hardware, software, firmware or a combination thereof, including one or more signal processing and/or application specific integrated circuits (ASICs).

Figure 2:
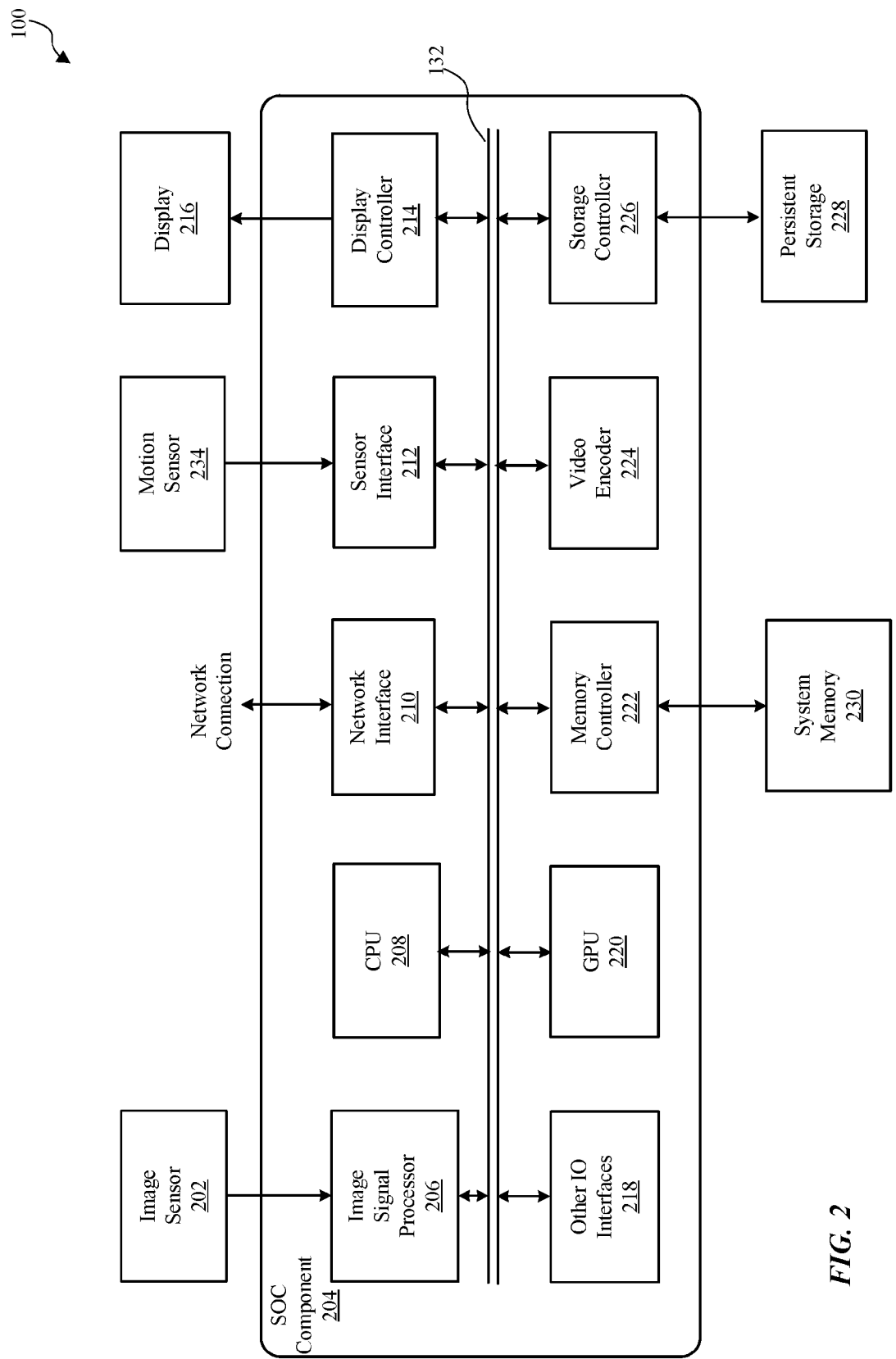
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensor 202 is a component for capturing image data and may be embodied, for example, as a complementary metal-oxide-semiconductor (CMOS) active-pixel sensor a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color filter array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs.

In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface 210 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensor 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
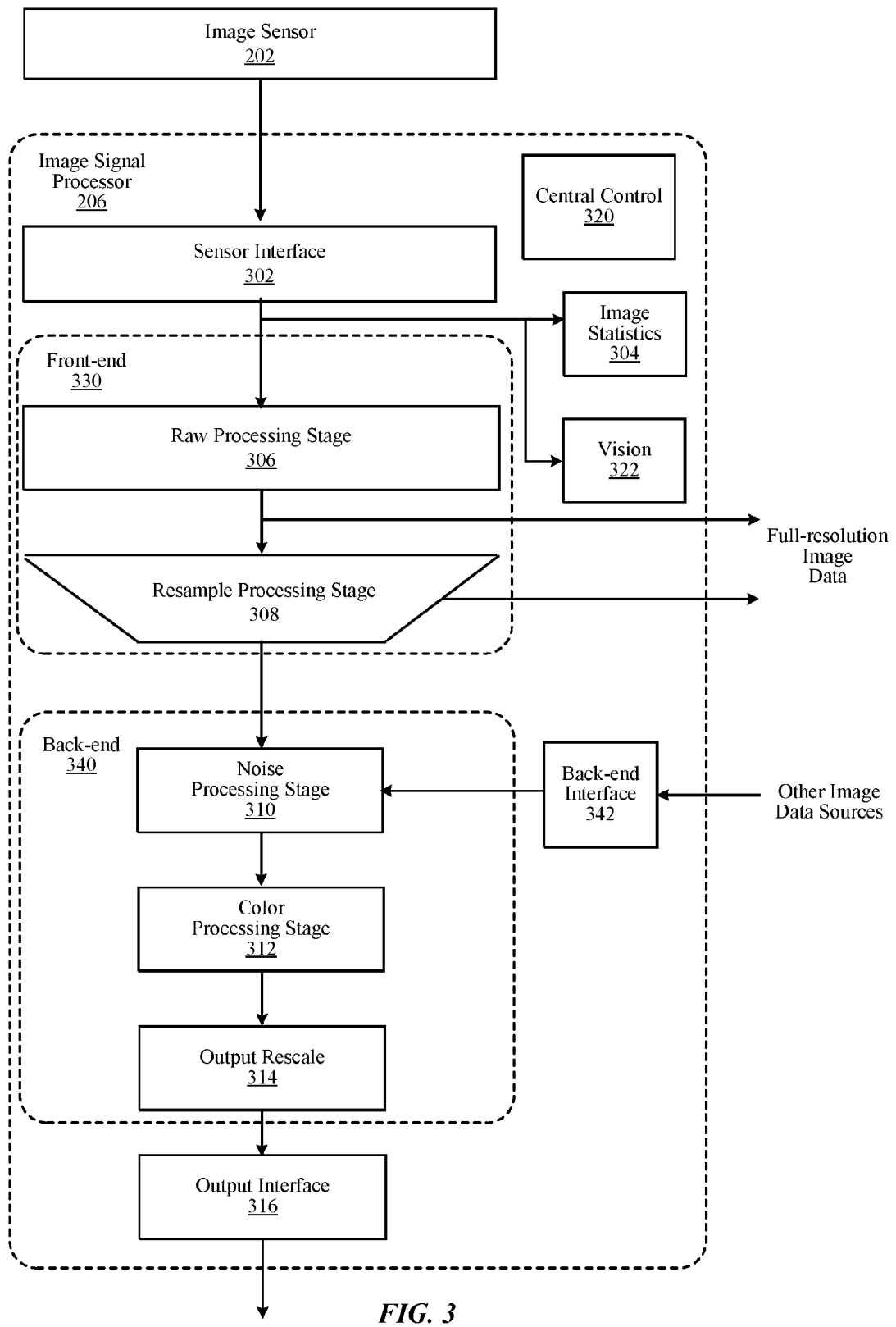
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to image sensor 202 to receive raw image data. ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, and output interface 316. ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 308 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle).

Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (i.e., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 308 may process image data in a Bayer raw format.

The operations performed by raw processing stage 308 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 308 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform special image effects, including black and white conversion, sepia tone conversion, negative conversion, or solarize conversion. For the purpose of Gamma mapping, lookup tables (or other structures that index pixel values to another value) for different color components or channels of each pixel (e.g., a separate lookup table for Y, Cb, and Cr color components) may be used. Color space conversion refers to converting color space of an input image data into a different format. In one embodiment, resample processing stage 308 converts RBD format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, mask patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), auto focus (AF)), histograms (e.g., 2D color or component) and any other image data information may be collected or tracked. In some embodiments, certain pixels' values, or areas of pixel values may be excluded from collections of certain statistics data (e.g., AF statistics) when preceding operations identify clipped pixels. Although only a single statistics module 304 is illustrated in FIG. 3, multiple image statistics modules may be included in ISP 206. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, convolution and generation of histogram-of-oriented gradients (HOG) data. The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. Convolution is heavily used tools in image/video processing and machine vision. Convolution may be performed, for example, to generate edge maps of images or smoothen images. HOG provides descriptions of image patches for tasks in image analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations.

Back-end interface 342 receives image data from other image sources than image sensor 202 and forwards it to other components of ISP 206 for processing. For example, image data may be received over a network connection and be stored in system memory 230. Back-end interface 342 retrieves the image data stored in system memory 230 and provide it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform special image effects. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (i.e. no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame (and thus is not a spatially filtered reference frame).

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 314 to various other components of system 100, as discussed above with regard to FIGS. 1 and 2.

In various embodiments, the functionally of components 302 through 342 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

HOG Module

Figure 4:
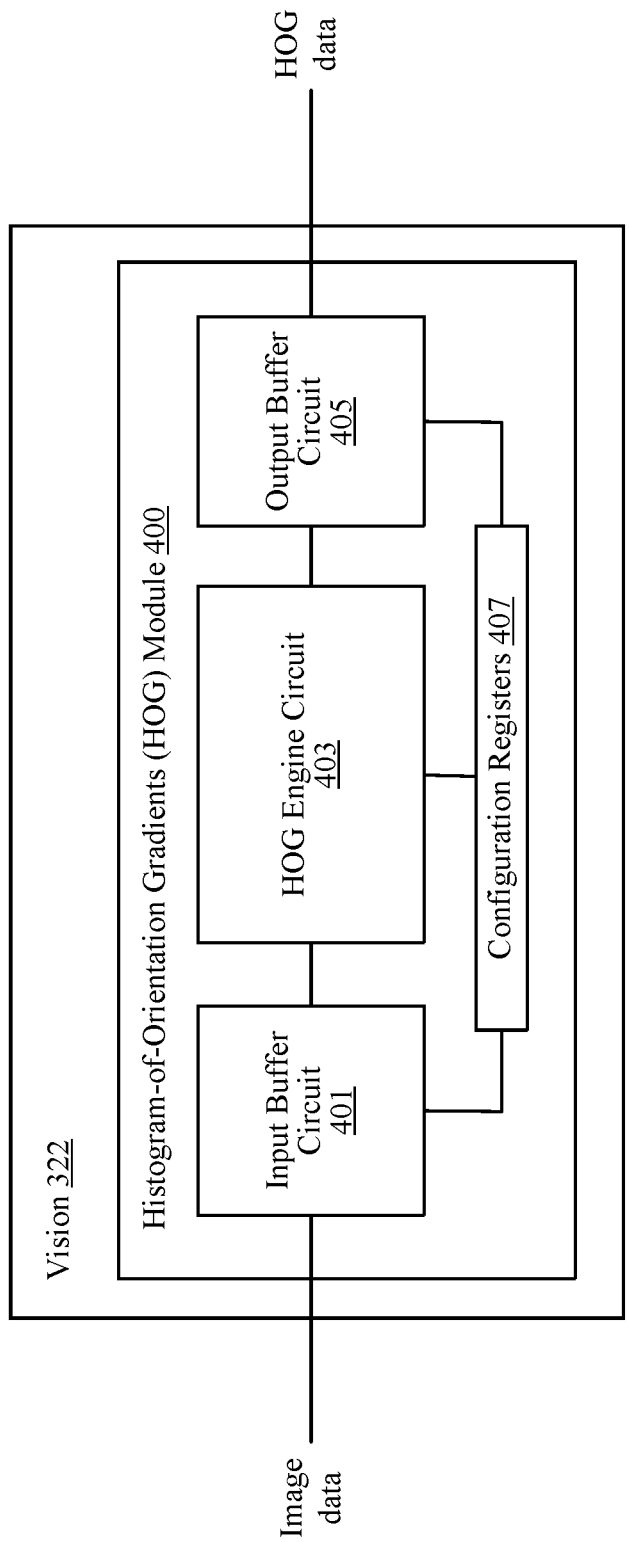
FIG. 4 is a block diagram illustrating a histogram-of-oriented gradients (HOG) module of the image signal processor, according to one embodiment.

FIG. 4 is a block diagram illustrating a vision module 322 in the image signal processor 206, according to one embodiment. As described above, the vision module 322 performs various operations to facilitate computer vision operations such as the generation of HOG data. FIG. 4 is a block diagram illustrating a histogram-of-oriented gradients (HOG) module 400 included in the vision module 322 of the ISP 206, according to one embodiment. Generally, the HOG module 400 processes images to create HOG data for each image. An example of HOG data is a histogram-of-oriented gradients that is generated for an image based on identified gradient orientations within the image. The HOG data can be used in various computer vision applications such as image classification, scene detection, facial expression detection, human detection, object detection, scene classification, virtual reality, augmented reality, and text classification.

As shown in FIG. 4, the HOG module 300 may include, among other components, an input buffer circuit 401, a HOG engine circuit 403, an output buffer circuit 405, and configuration registers 407. The HOG module 300 may include circuits other than or in addition to those illustrated in FIG. 4 in other embodiments.

The input buffer circuit 401 receives image data of an image for processing by the HOG module 400 and stores the received image data before it is processed by the HOG engine circuit 403, as described below. In one embodiment, the image data received by the input buffer circuit 401 is either 8-bit image data format or 12-bit image data format. Generally, the image data received by the input buffer circuit 401 includes only a certain component of a color image. For example, the image data may be luma data that describes brightness information of the associated image. The image data may alternatively be chroma data that conveys color information of the associated image. Alternatively, the image data may be raw image data. The image data may be received by the input buffer circuit 401 from the sensor interface 302 or from other image sources such as directly from the image sensor 202 or other image data sources.

The HOG engine circuit 403 processes image data received from the input buffer circuit 401 to generate HOG data of the image data. In one embodiment, HOG data is also referred to herein as gradient features of the image data. As mentioned above, a histogram-of-oriented gradients is an example of HOG data generated by the HOG engine circuit 403. A histogram of oriented gradients is a feature descriptor that describes the gradients of the image data. Operation of the HOG engine circuit 403 is described below with respect to FIG. 5.

The HOG engine circuit 403 outputs HOG data to the output buffer circuit 405. The output buffer circuit 405 stores the HOG data until the HOG data is ready for output according to the central control module 320. The output buffer circuit 405 may output HOG data in different bit formats. For example, the output buffer circuit 405 may output the HOG data in an 8-bit format or a 16-bit format. The bit format of the HOG data outputted by the output buffer circuit 405 may be different or the same as the bit format of the image data received by the input buffer circuit 401. In one embodiment, the output buffer circuit 405 outputs the HOG data directly to a convolution module (not shown). The convolution module may be included in the vision module 322 and performs functions such as edge map generation and/or image smoothing using the HOG data.

As shown in FIG. 4, the HOG module 400 also includes configuration registers 407. The configuration registers 407 are configurable registers that store configuration values transmitted by the central control module 320. The HOG module 400 sets operation parameters of the components of the HOG module 400 illustrated in FIG. 4 based on the configuration values stored in the configuration registers 407. That is, the operation parameters of the input buffer circuit 401, the HOG engine circuit 403, and the output buffer circuit 405 are set according to the configuration values stored in the configuration registers 407 by the central control module 320.

In one embodiment, each configuration register is associated with a specific operation parameter of the HOG module 400 and the configuration value stored in each configuration register determines how the associated operation parameter for the HOG module 400 is set. For example, whether the input buffer circuit 401 receives 8-bit or 12-bit image data is based on a value stored in a configuration register associated with the bit format of the image data. The different operation parameters of the HOG module 400 are described below with respect to FIG. 5.

Figure 5:
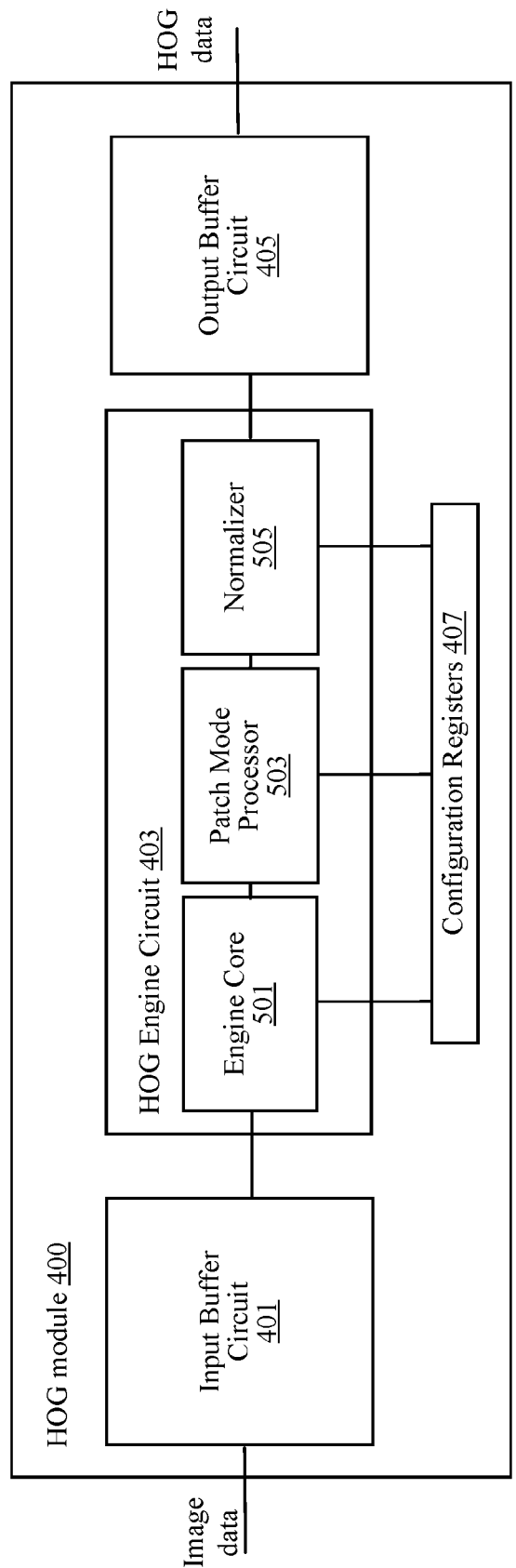
FIG. 5 is a block diagram illustrating a detailed view of a HOG engine circuit included in the HOG module, according to one embodiment.

FIG. 5 illustrates a detailed view of the HOG engine circuit 403 according to one embodiment. The HOG engine circuit 403 includes an engine core 501. The engine core 501 performs an algorithm for generating HOG data for image data received from the input buffer circuit 401. An algorithm for generating HOG data is well known to those skilled in the art of image processing and is described in brief detail below.

To generate the HOG data for image data, the engine core 501 first computes the gradients of the image data. To compute the gradients, the engine core 501 applies a mask to the image data in one or both of the horizontal and vertical directions to determine the gradients of the image data. For example, the engine core 501 may apply a 3×3 Sobel mask to the image data to identify the horizontal and vertical gradients of the image data within a cell defined by the mask. Other masks may also be used. The engine core 501 may optionally ignore any boundary gradients located at the boundaries of the image data.

Figure 6:
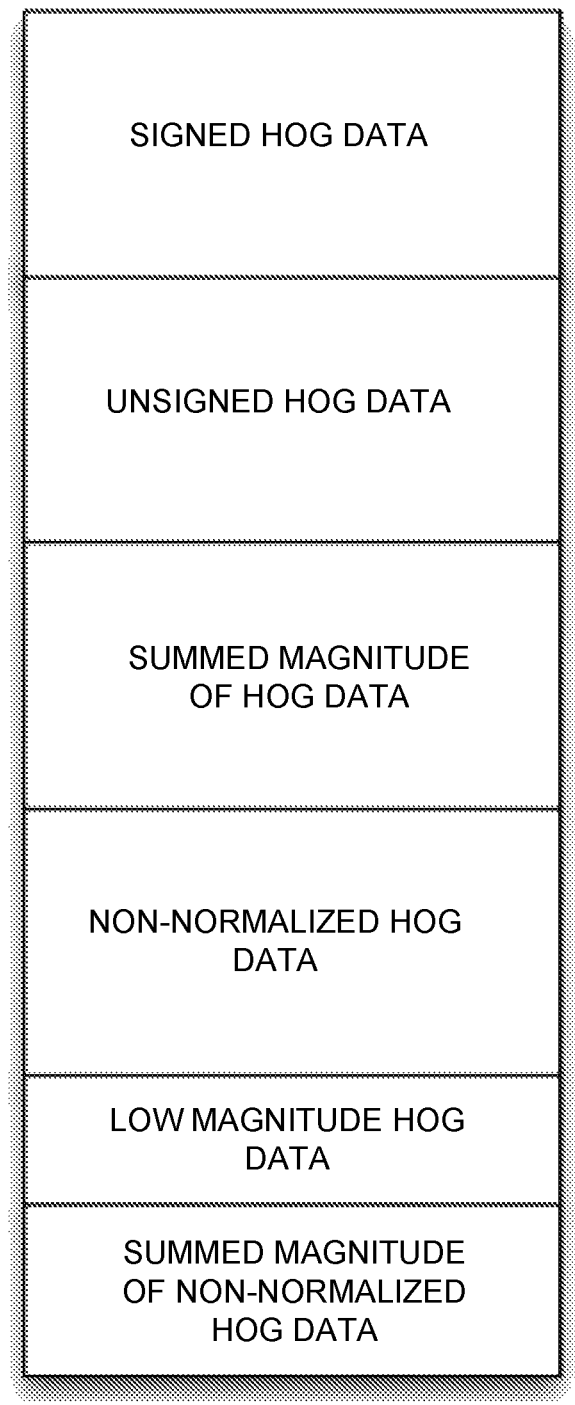
FIG. 6 is a diagram illustrating various types of HOG data outputted by the HOG module, according to one embodiment.

The engine core 501 generates a histogram of gradient features based on the computed gradients of the image data. Specifically, the engine core 501 generates a histogram-of-oriented gradients for each cell defined by the mask that is applied to the image data. A histogram-of-oriented gradients is an example of HOG data generated by the HOG module 400. The histogram-of-oriented gradients for each cell defined by the applied mask describe the distribution of the orientation of gradients of the image data within the cell. The HOG engine circuit 403 may include, for example, 16 orientation bins in a histogram-of-oriented gradients where each orientation bin is associated with a range of orientations. The number of orientation bins included in the histogram-of-orientated gradients is configurable in one embodiment. The orientation bins are evenly spread over 0 to 180 degrees ("unsigned") or 0 to 360 degrees ("signed"), depending on whether the gradients are "unsigned" or "signed." Unsigned or signed HOG data that is not normalized by the normalizer 505 described below is referred to as "non-normalized HOG data" as shown in FIG. 6. FIG. 6 illustrates the different types of HOG data generated by the HOG engine circuit 403 according to one embodiment.

To create a histogram-of-oriented gradients for a cell, the engine core 501 determines for the target pixel within the cell a weight for an orientation-based histogram bin based on the value of the gradient calculated in the gradient computation. The engine core 501 increases the count of an orientation bin if the value of the gradient for the pixel is a value is within the range of orientations associated with the orientation bin.

In one embodiment, pixel contribution to an orientation bin is based on gradient magnitude. The engine core 501 determines the gradient magnitude for each pixel based on the root of the squared sum of the pixel difference in the horizontal direction (dx) for the pixel and the pixel difference in the vertical direction (dy) for the pixel. Thus, rather than merely increasing the count of an orientation bin if the value of the gradient for the pixel is within the range of orientations associated with the orientation bin, the engine core 501 increases the count of an orientation bin according to the magnitude of the gradient. The engine core 501 may also identify the angle for each pixel by calculating the arc tangent of the ratio of the pixel difference in the horizontal direction (dx) for the pixel and the pixel difference in the vertical direction (dy) for the pixel.

As shown in FIG. 5, the HOG engine circuit 403 also includes a normalizer 505 in one embodiment. The normalizer 505 optionally normalizes histograms-of-oriented gradients generated by the HOG engine circuit 403 to smooth the energy represented in the histograms. The normalizer 505 may use any normalization scheme to normalize the histograms such as L2-norm, L2-hys, L1-norm, and L1-sqrt. However, other normalization algorithms may be employed.

In one embodiment, the normalizer 505 is enabled or the type of normalization algorithm to be used is determined based on the configuration of the configuration registers 407. That is, the configuration registers 407 includes one or more configuration registers that are associated with the normalizer 505. The normalizer 505 may be enabled to normalize HOG data according to the values set in the configuration registers associated with the normalizer 505.

As mentioned above, HOG data may be "signed" or "unsigned." In one embodiment, signed HOG data that is normalized by the normalizer 505 is referred to as "signed HOG data" as shown in FIG. 6. Similarly, unsigned HOG data that is normalized by the normalizer 505 is referred to as "unsigned HOG data" as shown in FIG. 6. The use of "signed HOG data" and "unsigned HOG data" is based on the application and is typically used to differentiate between similar features. For example, "signed HOG data" is used in an application to differentiate between a black-to-white 45 degree edge and a white-to-black 45 degree edge. In contrast, if an application considers both the black-to-white 45 degree edge and the white-to-black 45 degree edge equivalent, the application uses the "unsigned HOG data."

The engine core 501 may optionally calculate a sum of all the orientation bins from the normalized signed HOG data. The sum of all the orientation bins from the normalized signed HOG data is referred to as a "summed magnitude of HOG data" shown in FIG. 6. The summed magnitude of normalized HOG data is a single number that indicates how the region within a cell is "textured" or whether it has edges with large magnitudes. As mentioned, above, the value of an orientation-based bin is increased when a particular orientation of a pixel is identified. The "summed magnitude of HOG data" is used by applications to differentiate between similar features. For example, the "summed magnitude of HOG data is used by applications to differentiate between similar features with different amounts of texture such as a diagonal line in a white background and a diagonal line in a background of grass.

To calculate the sum of the normalized signed HOG data, rather than increasing the value of an orientation-based histogram bin when a particular orientation associated with the bin is identified, the engine core 501 increases the value of an orientation bin according to the magnitude of the edge from the image data having the orientation associated with the orientation bin. Thus, even if the image data has the same angle distribution across the different orientation bins, the orientation histogram generated for by the engine core 501 for a particular orientation bin has larger values if the edges assigned to the bin have a larger magnitude (e.g., a higher local contrast). Once the engine core 501 has identified the HOG data for received image data, the engine core 501 sums the values included in the orientation-bins to generate the summed magnitude of HOG data for the image data.

Similar to the "summed magnitude of HOG data," the engine core 501 may optionally calculate a sum of all the orientation bins from the non-normalized signed HOG data. In one embodiment, the sum of all the orientation bins from the non-normalized signed HOG data is referred to as a "summed magnitude of non-normalized HOG data" as shown in FIG. 6. The engine core 501 calculates the "summed magnitude of non-normalized HOG data" in a similar manner as the "summed magnitude of HOG data" described above except using the non-normalized HOG data rather than the normalized HOG data. Similar to the "summed magnitude of non-normalized HOG data," the "summed magnitude of non-normalized HOG data" is used to distinguish between similar features with different textures.

The engine core 501 may also identify the total number of edges in the image data that have a magnitude less than a threshold magnitude. The threshold magnitude may be established by the designer of the vision module 322. The engine core 501 calculates the magnitude of each edge in the image data and increments a count responsive to the magnitude of an edge being less than the threshold magnitude. The total number of edges in the image data that have a magnitude less than the threshold magnitude is referred to as "low magnitude HOG data" as shown in FIG. 6. In one embodiment, the "low magnitude HOG data" is used by an application to differentiate between similar features with different amounts of local contrast.

Returning back to FIG. 5, in one embodiment the HOG engine circuit 403 includes a patch mode processor 503. The patch mode processor 503 may include similar functionality as the engine core 501 and is optionally enabled to cause the HOG engine circuit 403 to operate in a patch mode. In contrast to the engine core 501, the patch mode processor 503 can process image data of an image that includes multiple image patches during the patch mode. The central control module 320 may provide the image data of the image that includes multiple image patches to the HOG module 400.

Figure 7:
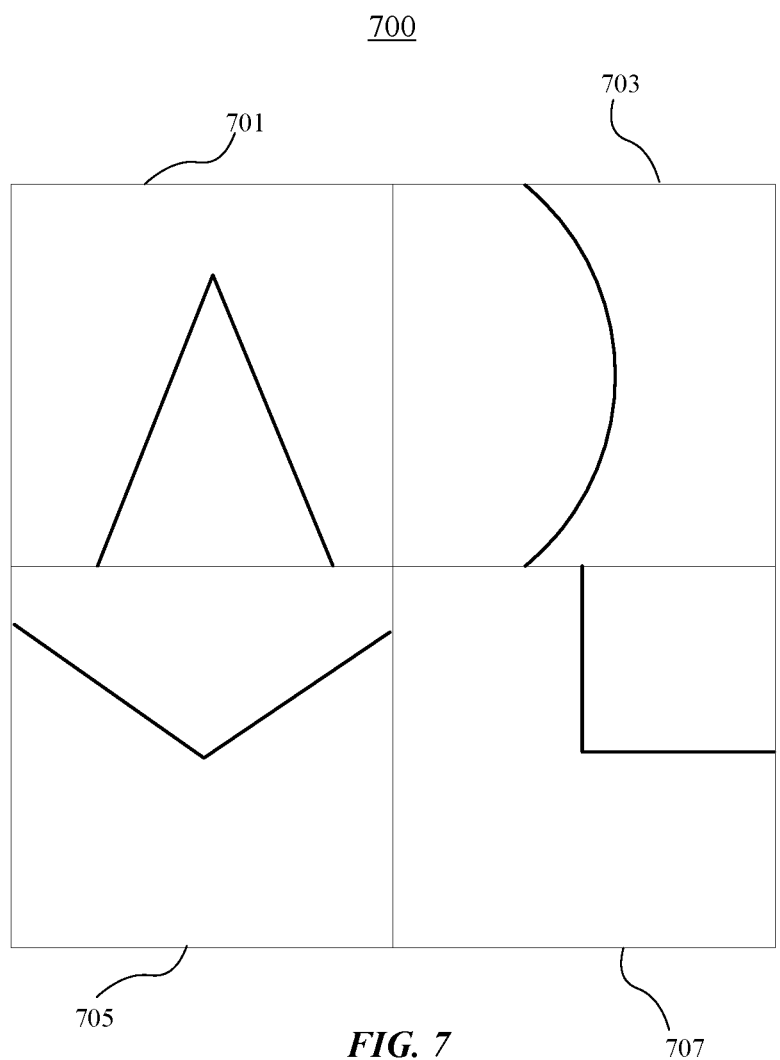
FIG. 7 is a diagram illustrating an image including image patches for processing by the HOG module, according to one embodiment.

FIG. 7 illustrates an image 700 that includes a plurality of image patches that are processed by the patch mode processor 503. Image 700 includes a patch 701, a patch 703, a patch 705, and a patch 707. The patch mode processor 503 identifies the boundaries of the different patches and ignores the pixels located at the boundaries during processing of image 700 in one embodiment. The patch mode processor 503 may generate histograms-of-oriented gradients for the multiple image patches included in the image 700 as described above with respect to the engine core 501. That is, the patch mode processor 503 generates a histogram-of-oriented gradients for patch 701, patch 703, patch 705, and patch 707.

In one embodiment, each image patch included in the image received during the patch mode may be extracted from a distinct image. Thus, the image received during the patch mode may be composed of image patches from different images. For example, FIGS. 8A to 8D illustrate distinct images that each have an image patch included in the image 700 shown in FIG. 7. The different images shown in FIGS. 8A to 8D are considered the source images for the image patches included in image 700.

Figure 8A:
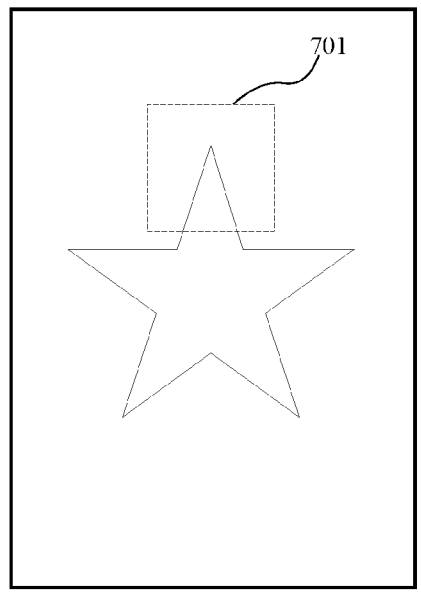
FIGS. 8A, 8B, 8C, and 8D are diagrams illustrating different images that include the image patches shown in FIG. 7, according to one embodiment.
Figure 8B:
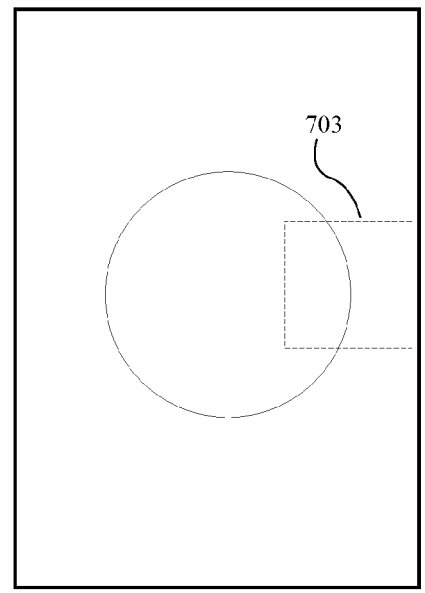
Figure 8C:
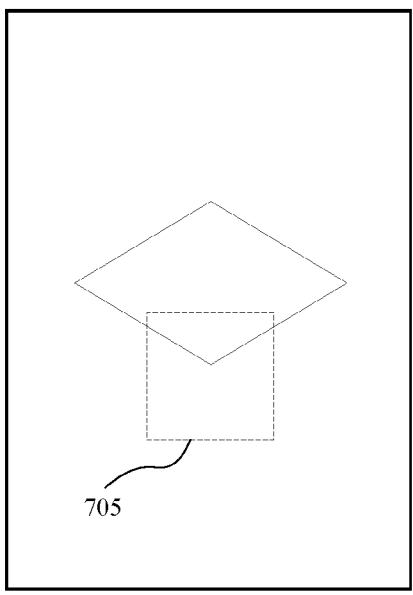
Figure 8D:
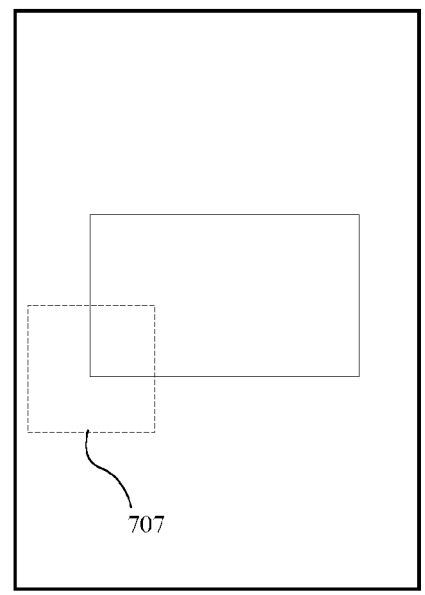

Specifically, FIG. 8A illustrates in image of a star with image patch 701 indicating an area of interest in the image of the star. FIG. 8B illustrate an image of a circle with image patch 703 indicating an area of interest in the image of the circle. FIG. 8C illustrate an image of a diamond with image patch 705 indicating an area of interest in the image of the diamond. Lastly, FIG. 8D illustrate an image of a rectangle with an image patch 707 indicating an area of interest in the image of the rectangle. In one embodiment, the central control module 320 specifies the locations of the image patches within each image shown in FIGS. 8A to 8D for processing during the patch mode. In one embodiment, the configuration registers 407 store the location of the image patches within the source images.

In another embodiment, each image patch included in the image for processing during the patch mode may be extracted from a single source image. When the image patches are extracted from a single source image, each image patch represents a different area of interest of the single source image. Each image patch may be specified by the central control module 320. By operating in the patch mode, the HOG module 400 can efficiently process the different image patches in a single image rather than process the different images from which the different image patches were extracted or process the entire source image from which the image patches were extracted.

Returning back to FIG. 5, as described above, the HOG module 400 includes configuration registers 407. The configuration values stored in the configuration registers 407 are set by the central control module 320. Operation parameters of the HOG module 400 are set based on the configuration values stored in the configuration registers 407. An example of an operation parameter is a bit format of the image data received by the HOG module 400. For example, whether the input buffer circuit 401 receives 8-bit or 12-bit image data is based on a configuration value stored in a configuration register associated with the bit format of the image data. Another example of an operation parameter is the type of image represented by the image data. For example, whether the input buffer circuit 401 receives luma image data or chroma image data is based on a value stored in a configuration register associated with the bit format of the image data.

Another example of an operation parameter is a bit format of the HOG data outputted by the HOG module 500. For example, whether the output buffer circuit 405 outputs HOG data in an 8-bit format or 12-bit format is based on a value stored in a configuration register associated with the bit format of the output buffer circuit 405.

With respect to the HOG engine circuit 403, as described above the HOG engine circuit 403 may output different types of gradient features shown in FIG. 6 which are considered operation parameters. The different type of gradient features include signed HOG data, unsigned HOG data, summed magnitude of HOG data, non-normalized HOG data, low magnitude HOG data, and summed magnitude of non-normalized HOG data. Each type of gradient feature is enabled for output by the HOG engine circuit based on the configuration of the configuration registers 407. In one embodiment, at least one of the different types of gradient features may be enabled for output. Furthermore, the number of orientation bins included in HOG data is configurable based on the configuration of the configuration registers 407.

Lastly, the settings of the configuration registers 407 may also determine whether the HOG engine circuit 403 operates in the patch mode and whether the HOG data is normalized as described above. Responsive to the configuration registers associated with the patch mode and normalization storing values to enable patch mode and normalization functionality, the HOG engine circuit 403 enables the patch mode processor 503 and normalizer 505.

Example Process of Generating HOG Data

Figure 9:
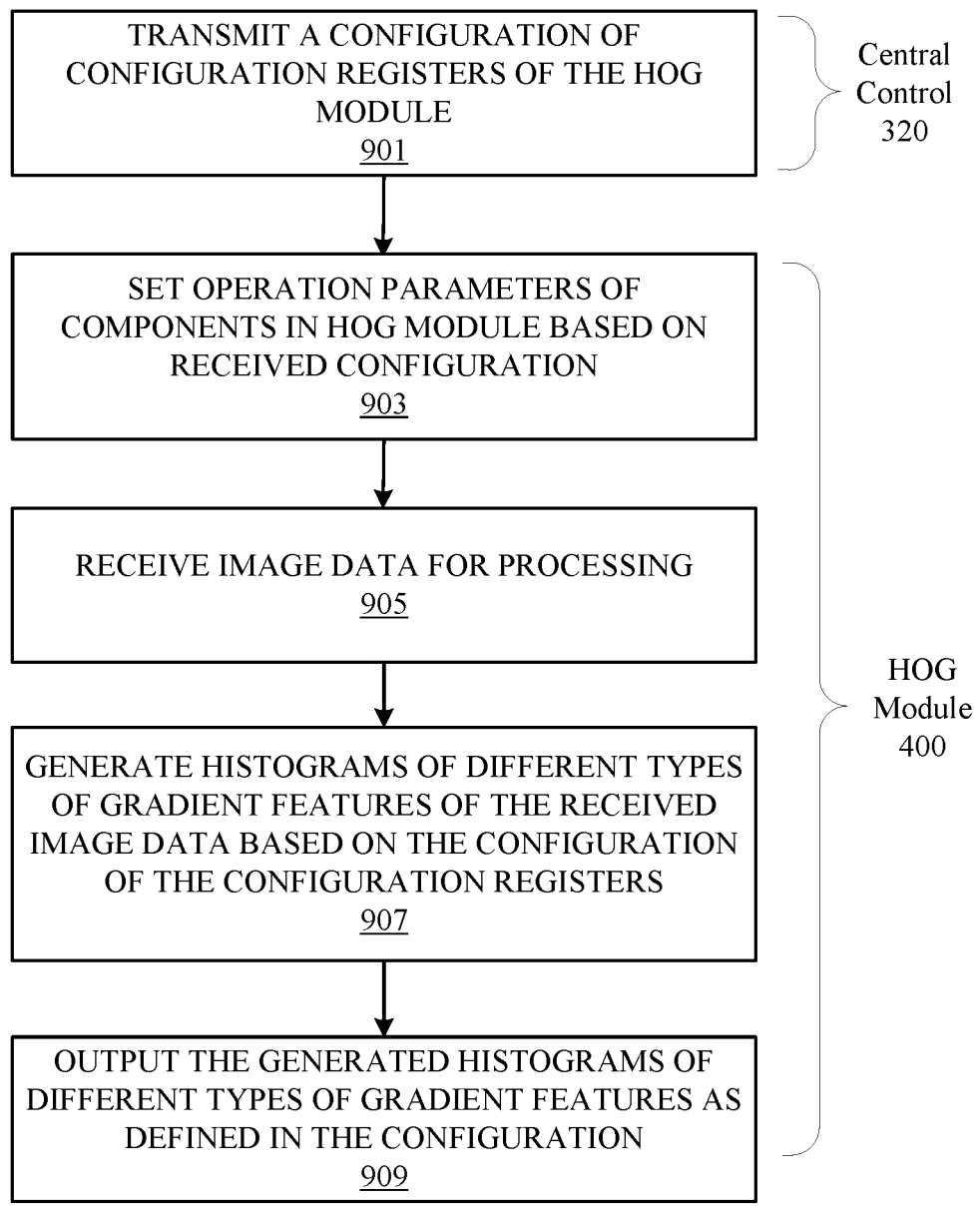
FIG. 9 is a flowchart illustrating a method of the HOG module for processing an image, according to one embodiment.

FIG. 9 illustrates a flowchart for generating histograms of gradient features according to one embodiment. Note that in other embodiments, steps other than those shown in FIG. 9 may be performed.

In one embodiment, the central control module 320 generates and transmits 901 configuration values to the configuration registers 407. The HOG module 400 sets 903 the operation parameters of the components of the HOG module 400 based on the received configuration values from the central control module 320. For example, the operation parameters of the input buffer 401 and/or the HOG engine circuit 403 are set based on the configuration values of the configuration registers 407.

The HOG module 400 receives 905 an image for processing. The HOG module 400 generates 905 histograms of different types of gradient features of the received image data based on the configuration of the configuration registers 407. The different types of gradient features include signed HOG data, unsigned HOG data, summed magnitude of HOG data, non-normalized HOG data, low magnitude HOG data, and summed magnitude of non-normalized HOG data. Each type of gradient feature is enabled for output by the HOG engine circuit based on the configuration of the configuration registers 407. The HOG module 400 then outputs 909 the generated histograms of different types of gradient features as defined in the configuration of the configuration registers 407.

Figure 10:
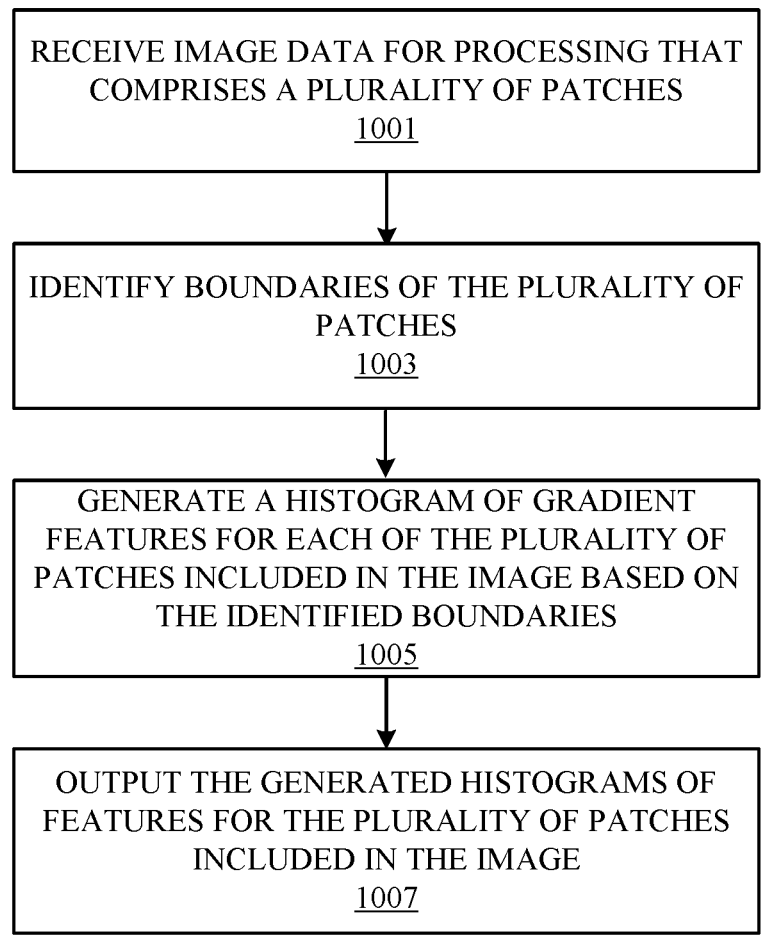
FIG. 10 is a flowchart illustrating a method of the HOG module for performing patch processing of an image, according to one embodiment.

FIG. 10 illustrates a flowchart for processing image data during the patch mode according to one embodiment. Note that in other embodiments, steps other than those shown in FIG. 10 may be performed.

In one embodiment, the HOG module 400 receives 1001 image data for processing that includes a plurality of image patches. The image patches may be from different source images or from a single source image.

The HOG module 400 identifies 1003 boundaries of the plurality of patches included in the image in order to ignore the pixels located at the boundaries. The HOG module 400 generates 1005 a histogram of gradient features for each of the plurality of patches included in the image based on the identified boundaries. The HOG module 400 outputs 1007 the generated histograms of gradient features for the plurality of patches included in the image.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A configurable histogram-of-oriented gradients (HOG) module comprising:
   a plurality of registers configured to store configuration values including a first configuration value;
   a HOG engine circuit coupled to the plurality of registers to receive the first configuration value, the HOG engine circuit configured to receive image data and generate histograms of different types of HOG features of the image data based on at least the first configuration value received from the plurality of registers, the different type of HOG features of the image data including a total number of edges in the image data with a magnitude less than a threshold; and
   an output interface circuit coupled to the HOG engine circuit, the output interface circuit configured to output the histograms of different types of HOG features generated by the HOG engine circuit to a computer processing unit coupled to the HOG module.

2. The configurable HOG module of claim 1, further comprising:
   an input interface circuit configured to receive the image data and provide the image data to the HOG engine circuit.

3. The configurable HOG module of claim 1, wherein the HOG engine circuit comprises:
   a normalizer configured to normalize at least one of the different types of HOG features according to a second configuration value stored in the plurality of registers.

4. The configurable HOG module of claim 3, wherein the different types of HOG features of the image data include non-normalized HOG features and the HOG engine circuit generates non-normalized HOG features of the image data based on a third configuration value stored in the plurality of registers.

5. The configurable HOG module of claim 3, wherein the different types of HOG features of the image data include a summation of magnitudes of edges included in the image data and the HOG engine circuit is configured to calculate the summation by (i) calculating a magnitude of each edge included in the image data and (ii) summing the magnitudes of the edges based on a third configuration value stored in the plurality of registers.

6. The configurable HOG module of claim 5, wherein the summation is based on normalized HOG features of the image data.

7. The configurable HOG module of claim 5, wherein the summation is based on non-normalized HOG features of the image data.

8. The configurable HOG module of claim 1, wherein the HOG engine circuit is configured to determine the total number of edges by:
calculating a magnitude of each edge in the image data; and
determining the total number of edges having magnitudes less the threshold.

9. The configurable HOG module of claim 1, further comprising a patch mode processor coupled to the HOG engine circuit, the patch mode processor configured to generate a histogram of gradient features for each of a plurality of patches included in the image data.

10. The configurable HOG module of claim 9, wherein each of the plurality of image patches is extracted from different source images.

11. The configurable HOG module of claim 9, wherein each of the plurality of image patches is extracted from a single source image.

12. A method, comprising:
    setting first operation parameters of components of a histogram-of-oriented gradients (HOG) module based on a first configuration value stored in a plurality of configuration registers included in the HOG module;
    receiving image data for processing by the HOG module;
    generating, by the HOG module, histograms of different types of HOG features of the received image data based on at least the first operation parameters set according to the first configuration value stored in the plurality of configuration registers the different type of HOG features of the received image data including a total number of edges in the received image data with a magnitude less than a threshold; and
    outputting the generated histograms of different types of HOG features to a computer processing unit coupled to the HOG module.

13. The method of claim 12, further comprising:
    receiving the first configuration value of the plurality of configuration registers from the computer processing unit coupled to the HOG module.

14. The method of claim 12, further comprising:
    normalizing at least one of the different types of HOG features according to a second configuration value stored in the plurality of configuration registers.

15. The method of claim 14, wherein the different types of HOG features of the image data include non-normalized HOG features and the method further comprising:
    generating non-normalized HOG features of the image data based on a third configuration value stored in the plurality of registers.

16. The method of claim 14, wherein the different types of HOG features of the image data include a summation of magnitudes of edges included in the image data and the method further comprising:
    calculating a magnitude of each edge included in the image data; and
    summing the magnitudes of the edges based on a third configuration value stored in the plurality of configuration registers.

17. The method of claim 16, wherein the summation is based on either normalized HOG features of the image data or non-normalized HOG features of the image data.

18. The method of claim 12 further comprising:
    calculating a magnitude of each edge in the image data; and
    determining the total number of edges having magnitudes less the threshold.

* * * * *

UNITED STATES PATENT AND TRADEMARK OFFICE
CERTIFICATE OF CORRECTION

PATENT NO. : 9,977,994 B2  
APPLICATION NO. : 15/198360  
DATED : May 22, 2018  
INVENTOR(S) : Suk Hwan Lim and Jaewon Shin Page 1 of 1

It is certified that error appears in the above-identified patent and that said Letters Patent is hereby corrected as shown below:

In the Claims

Column no: 17, Line(s): 26-27, Claim 1: "the different type" to read as --the different types--
Column no: 18, Line(s): 4, Claim 8: "less the threshold." to read as --less than the threshold.--
Column no: 18, Line(s): 27, Claim 12: "registers the different type" to read as --registers, the different types--
Column no: 18, Line(s): 66, Claim 18: "less the threshold." to read as --less than the threshold.--

Signed and Sealed this  
Twelfth Day of February, 2019

Andrei Iancu  
*Director of the United States Patent and Trademark Office*